United States Patent
Combs

(10) Patent No.: US 11,472,600 B2
(45) Date of Patent: Oct. 18, 2022

(54) STACKABLE/RECONFIGURABLE COMPARTMENT BINS

(71) Applicant: GM Global Technology Operations LLC, Detroit, MI (US)

(72) Inventor: Jeffrey G. Combs, Imlay City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 884 days.

(21) Appl. No.: 16/105,614

(22) Filed: Aug. 20, 2018

(65) Prior Publication Data

US 2020/0055631 A1    Feb. 20, 2020

(51) Int. Cl.
| | |
|---|---|
| *B65D 21/02* | (2006.01) |
| *B60R 7/04* | (2006.01) |
| *B65D 25/06* | (2006.01) |

(52) U.S. Cl.
CPC ............ *B65D 21/0215* (2013.01); *B60R 7/04* (2013.01); *B65D 25/06* (2013.01); *B65D 21/0209* (2013.01)

(58) Field of Classification Search
CPC ............ B65D 21/0215; B65D 21/0209; B65D 21/02; B65D 21/0212; B60R 7/04
See application file for complete search history.

(56) References Cited

U.S. PATENT DOCUMENTS

| | | | | |
|---|---|---|---|---|
| 4,498,584 A | * | 2/1985 | Newbury | A01K 63/02 206/504 |
| 6,216,872 B1 | * | 4/2001 | Haasbroek | B65D 11/1833 206/512 |
| 2010/0147727 A1 | * | 6/2010 | Valdimarsson | B65D 19/04 206/509 |
| 2012/0241350 A1 | * | 9/2012 | Stahl | B65D 21/045 206/509 |
| 2013/0233860 A1 | * | 9/2013 | Schreier | B65D 25/06 220/529 |
| 2016/0045381 A1 | * | 2/2016 | Spence | A61F 17/00 206/570 |
| 2018/0346191 A1 | * | 12/2018 | Chinni Vergottini | B65D 25/101 |

FOREIGN PATENT DOCUMENTS

CN    205131107 U    4/2016

* cited by examiner

*Primary Examiner* — Javier A Pagan

(74) *Attorney, Agent, or Firm* — Vivacqua Crane PLLC

(57) ABSTRACT

A storage compartment assembly for a motor vehicle includes a plurality of compartment bins, each having a first wall connected at an angle to a second wall connected at an angle to a third wall connected at an angle to a fourth wall also connected at an angle to the first wall, the first, second, third, and fourth walls connected at an angle to a base portion, the first, second, third, fourth walls, and the base portion partially enclosing a volume, a plurality of foot portions extending from the base portion at intersections of the first, second, third, and fourth walls, a plurality of support members extending from the intersections of the first, second, third, and fourth walls and displaced vertically directly above the foot portions, each of the plurality of compartment bins stackable atop each of the others of the plurality of compartment bins in a plurality of permutations.

16 Claims, 7 Drawing Sheets

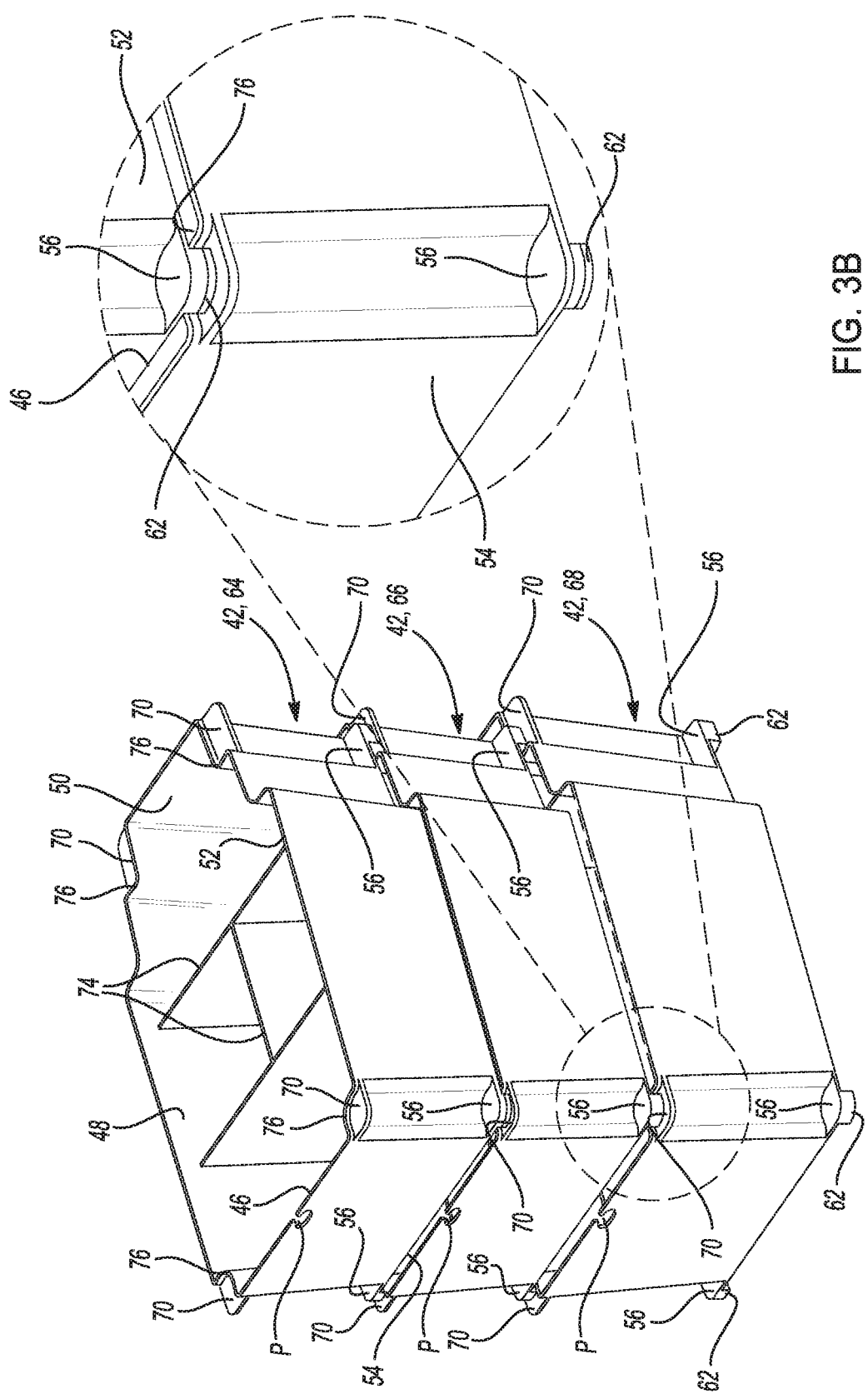

STACKABLE/RECONFIGURABLE COMPARTMENT BINS

The statements in this section merely provide background information relating to the present disclosure, and may not constitute prior art.

The present disclosure generally relates to motor vehicles, and more specifically to storage within center consoles of motor vehicles. Motor vehicles commonly include center consoles disposed between the front driver and passenger seats. Center consoles typically include pockets, holders, and slots for storing various items, such as cups, pens, coins, etc. Center consoles also often include bins for storing larger items, such as compact disc jewel cases, road maps, and sunglasses. The bins are covered by hinged lids that serve as armrests for the front occupants. Conventional center console designs are, however, usually box-shaped and lack dividers or other similar features for organizing the contents of the bin. Additionally, conventional center console designs often offer limited storage solutions beneath the armrest itself. Such limited storage solutions can manifest in disorganization within the bin. Accordingly, there is a need in the art for new and improved center console bins that provide a low-cost, relatively simple construction, and improved organization for users of storage space within motor vehicle center consoles.

SUMMARY

According to several aspects of the present disclosure a storage compartment assembly for a motor vehicle includes a plurality of compartment bins, each of the plurality of compartment bins including a first wall extending towards and connected at an angle to a second wall, the second wall extending from the first wall towards and connected at an angle to a third wall, the third wall extending from the second wall towards and connected at an angle to a fourth wall, the fourth wall extending from the third wall towards and connected at an angle to the first wall, each of the first, second, third, and fourth walls extending from and connected at an angle to a base portion, the first, second, third, and fourth walls, and the base portion partially enclosing a first volume. Each of the plurality of compartment bins including a plurality of foot portions extending outwardly from the base portion relative to the first volume at intersections of the first and second walls, the second and third walls, the third and fourth walls, and the fourth and first walls, a plurality of support members extending outwardly from the intersections of the first and second walls, the second and third walls, the third and fourth walls, and the fourth and first walls, and displaced vertically directly above the foot portions, relative to the base portion. Each of the plurality of compartment bins is stackable atop each of the others of the plurality of compartment bins in a plurality of permutations, and the plurality of compartment bins is disposed within the storage compartment.

In another aspect of the present disclosure each of the first, second, third, and fourth walls has a first height, and at least one of the first, second, third and fourth walls has a first height less than at least another of the first, second, third, and fourth walls.

In another aspect of the present disclosure at least one of the first, second, third, and fourth walls is formed with a passageway, and the passageway is shaped and sized to accommodate an electrical device.

In another aspect of the present disclosure each of the first, second, third, and fourth walls flares outwardly as the first, second, third, and fourth walls extend away from the base portion.

In another aspect of the present disclosure the plurality of foot portions or the plurality of support portions further include a foot pad including a resilient material.

In another aspect of the present disclosure each of the plurality of compartment bins further includes a plurality of dividers.

In another aspect of the present disclosure the plurality of dividers have a second height less than the first height and the plurality of dividers are reconfigurable within the plurality of compartment bins.

In another aspect of the present disclosure a first of the plurality of compartment bins has a first wall height, a second of the plurality of compartment bins has a second wall height different than the first wall height, and a third of the plurality of compartment bins has a third wall height different than the first wall height and the second wall height.

In another aspect of the present disclosure a quantity of the plurality of compartment bins used in the storage compartment is variable.

In another aspect of the present disclosure each of the plurality of compartment bins has a substantially uniform material thickness and is unitarily formed.

In another aspect of the present disclosure the plurality of compartment bins includes a plastic, composite, or metal 3-D printed material, directed light fabricated material, direct-shell production cast material, ballistic particle manufactured material, selected laser sintered material, injection molded material, rotational (roto) molded material, extrusion blow molded material, injection blow molded material, vacuum cast material, thermoformed material, or compression molded material.

In another aspect of the present disclosure a storage compartment assembly for a motor vehicle includes a plurality of plastic or composite compartment bins, each of the plurality of compartment bins including a first wall extending towards and connected at an angle to a second wall, the second wall extending from the first wall towards and connected at an angle to a third wall, the third wall extending from the second wall towards and connected at an angle to a fourth wall, the fourth wall extending from the third wall towards and connected at an angle to the first wall, each of the first, second, third, and fourth walls extending from and connected at an angle to a base portion, the first, second, third, and fourth walls, and the base portion partially enclosing a first volume. Each of the plurality of compartment bins further includes a plurality of foot portions extending outwardly from the base portion relative to the first volume at intersections of the first and second walls, the second and third walls, the third and fourth walls, and the fourth and first walls, and a plurality of support members extending outwardly from the intersections of the first and second walls, the second and third walls, the third and fourth walls, and the fourth and first walls, and displaced vertically directly above the foot portions, relative to the base portion. Each of the first, second, third, and fourth walls has a first height, and at least one of the first, second, third and fourth walls has a first height less than at least another of the first, second, third, and fourth walls, at least one of the first, second, third, and fourth walls is formed with a passageway, the passageway shaped and sized to accommodate an electrical device, each of the plurality of compartment bins is stackable atop each of the others of the plurality of compartment bins in a plurality of permutations, and the plurality of compartment bins is disposed within the storage compartment.

In another aspect of the present disclosure each of the first, second, third, and fourth walls flares outwardly as the first, second, third, and fourth walls extend away from the base portion.

In another aspect of the present disclosure the plurality of foot portions or the plurality of support portions further include a foot pad including a resilient material.

In another aspect of the present disclosure each of the plurality of compartment bins further includes a plurality of dividers.

In another aspect of the present disclosure the plurality of dividers have a second height less than the first height and the plurality of dividers are reconfigurable within the plurality of compartment bins.

In another aspect of the present disclosure a first of the plurality of compartment bins has a first wall height, a second of the plurality of compartment bins has a second wall height different than the first wall height, and a third of the plurality of compartment bins has a third wall height different than the first wall height and the second wall height.

In another aspect of the present disclosure the plurality of compartment bins used in the storage compartment is variable.

In another aspect of the present disclosure the plurality of compartment bins includes a plastic or composite 3-D printed material, directed light fabricated material, direct-shell production cast material, ballistic particle manufactured material, selected laser sintered material, injection molded material, rotational (roto) molded material, extrusion blow molded material, injection blow molded material, vacuum cast material, thermoformed material, or compression molded material, and each of the plurality of compartment bins has a substantially uniform material thickness.

In another aspect of the present disclosure a storage compartment assembly for a motor vehicle includes a plurality of 3-D printed plastic or composite compartment bins having uniform thickness, each of the plurality of compartment bins including: a first wall extending towards and connected at an angle to a second wall, the second wall extending from the first wall towards and connected at an angle to a third wall, the third wall extending from the second wall towards and connected at an angle to a fourth wall, the fourth wall extending from the third wall towards and connected at an angle to the first wall, each of the first, second, third, and fourth walls extending from and connected at an angle to a base portion, the first, second, third, and fourth walls, and the base portion partially enclosing a first volume. Each of the plurality of compartment bins further includes a plurality of foot portions extending outwardly from the base portion relative to the first volume at intersections of the first and second walls, the second and third walls, the third and fourth walls, and the fourth and first walls, and a plurality of support members extending outwardly from the intersections of the first and second walls, the second and third walls, the third and fourth walls, and the fourth and first walls, and displaced vertically directly above the foot portions, relative to the base portion. Each of the first, second, third, and fourth walls has a first height, and at least one of the first, second, third and fourth walls has a first height less than at least another of the first, second, third, and fourth walls, at least one of the first, second, third, and fourth walls is formed with a passageway, the passageway shaped and sized to accommodate an electrical device, each of the plurality of compartment bins is stackable atop each of the others of the plurality of compartment bins in a plurality of permutations, and the plurality of compartment bins is disposed within the storage compartment, each of the first, second, third, and fourth walls flares outwardly as the first, second, third, and fourth walls extend away from the base portion, the plurality of foot portions or the plurality of support portions further comprise a foot pad including a resilient material, and each of the plurality of compartment bins further includes a plurality of dividers having a second height less than the first height, and a first of the plurality of compartment bins has a first wall height, a second of the plurality of compartment bins has a second wall height different than the first wall height, and a third of the plurality of compartment bins has a third wall height different than the first wall height and the second wall height.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is a partial perspective view of a plurality of stackable/reconfigurable compartment bins according to an aspect of the present disclosure;

FIG. 3B is a partial perspective view of a foot portion of the plurality of stackable/reconfigurable compartment bins of FIG. 3A according to an aspect of the present disclosure;

DETAILED DESCRIPTION

Figure 1:
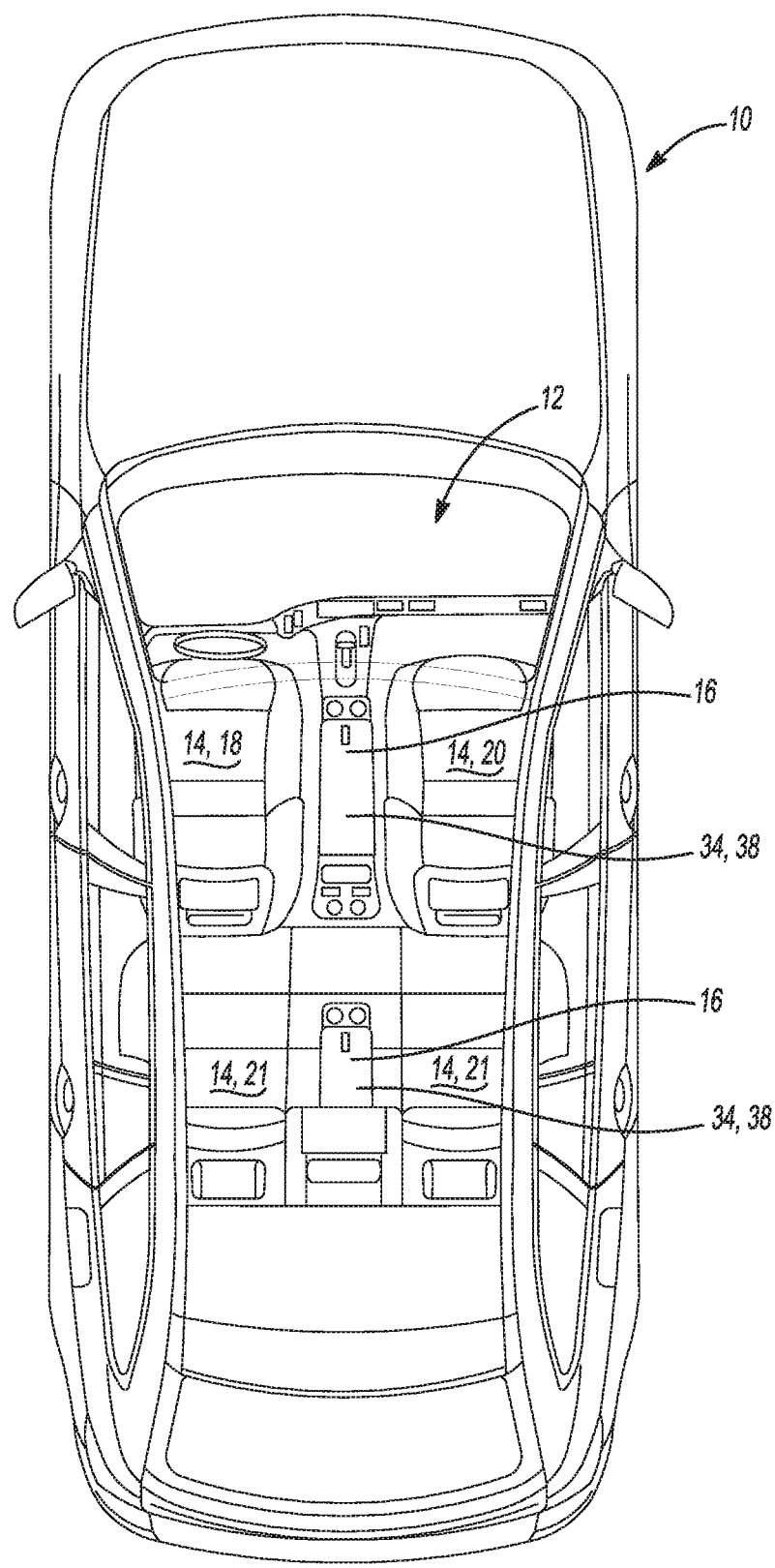
FIG. 1 is an environmental view of a motor vehicle equipped with stackable/reconfigurable compartment bins for a motor vehicle center console according to an aspect of the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. Likewise, the terms "forward", "rear", "inner", "inwardly", "outer", "outwardly", "above", and "below" are terms used relative to the orientation of the motor vehicle as shown in the drawings of the present application. Thus, "forward" refers to a direction toward a front of a motor vehicle, "rearward" refers to a direction toward a rear of a motor vehicle, "passenger" refers to a direction towards a passenger side of the motor vehicle (right-hand side in the context of this particular application), "driver" or "driver side" refers to a direction towards the driver's side of the motor vehicle (right-hand side in the context of this particular application), "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses.

The system and methodology described herein can be utilized to enhance a determination when a transmission is in a park position or in an out-of-park position. While the approach and methodology are described below with respect to vehicle applications, one of ordinary skill in the art would appreciate that an automotive application is merely exemplary, and that the concepts disclosed herein may also be applied to any other suitable compartments, and more specifically to suitable storage compartments within a motor vehicle. The term "vehicle" as described herein can be construed broadly to include not only a passenger automobile, but any other vehicle including, but not limited to, rail systems, planes, off-road sport vehicles, robotic vehicles, motorcycles, trucks, sport utility vehicles (SUVs), recreational vehicles (RVs), marine vessels, aircraft, farming vehicles, construction vehicles, and the like.

Figure 2A:
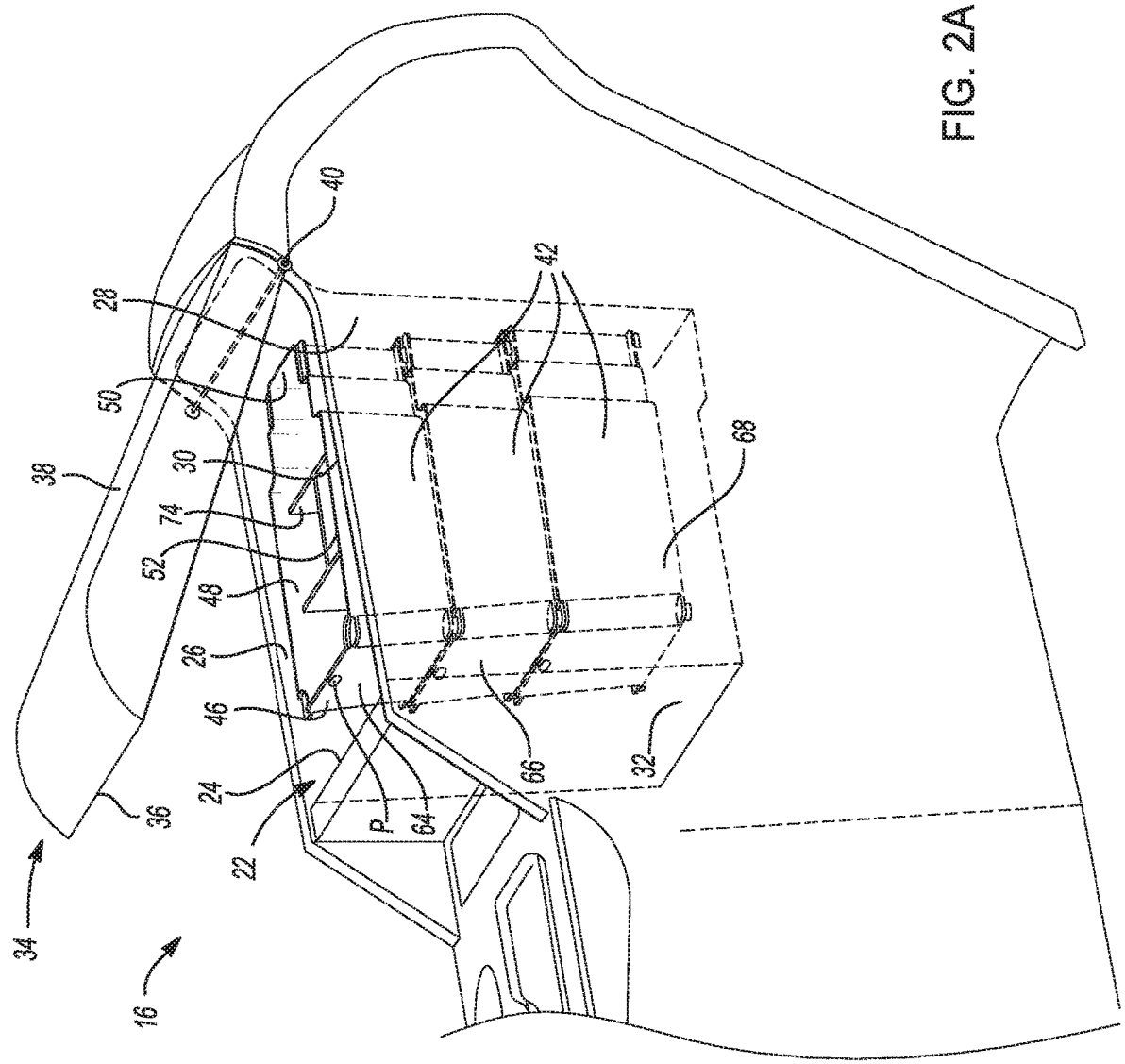
FIG. 2A is a partial perspective environmental view of a motor vehicle center console having stackable/reconfigurable compartment bins according to an aspect of the present disclosure.
Figure 2B:
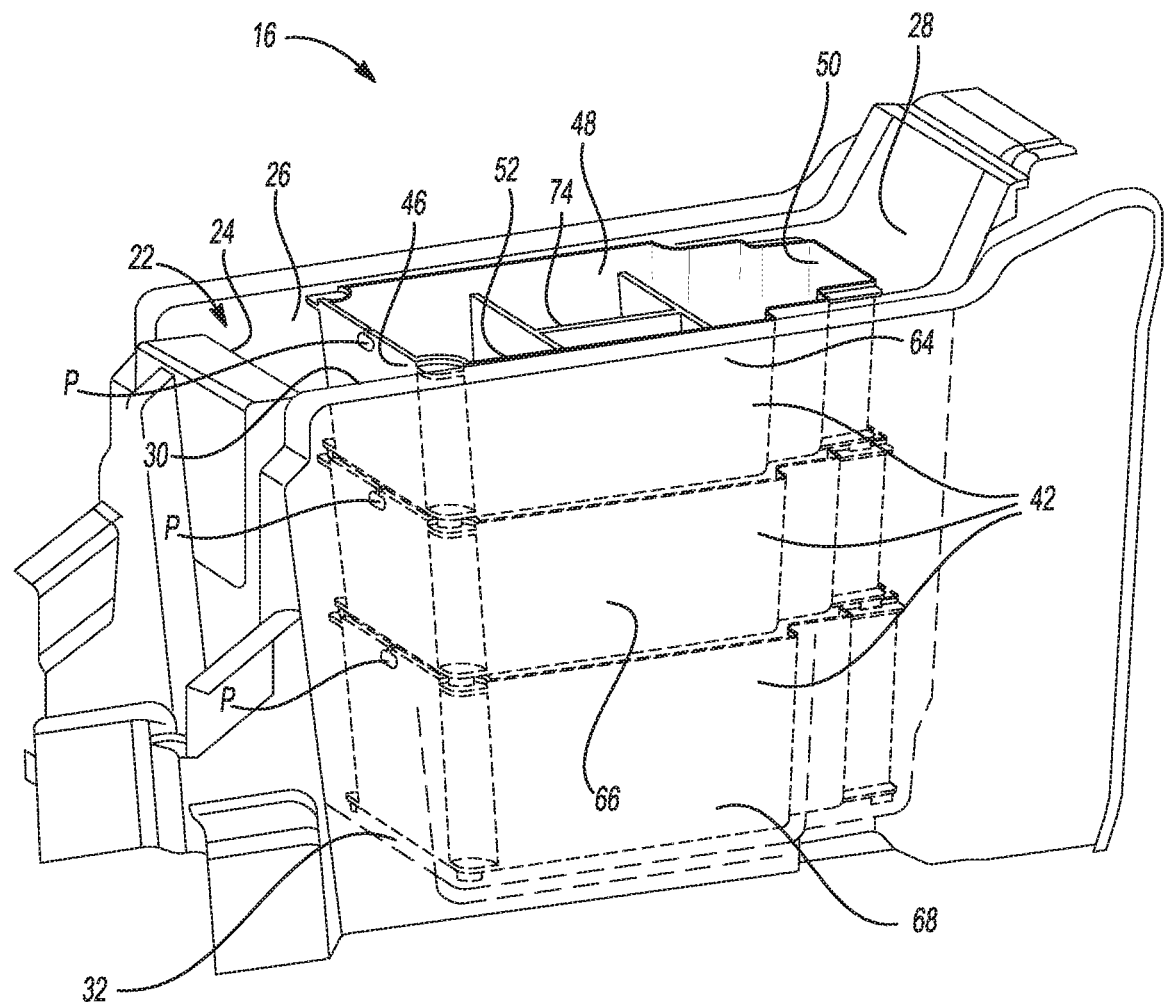
FIG. 2B is a partial perspective view of a portion of a motor vehicle center console having stackable/reconfigurable compartment bins according to an aspect of the present disclosure.

Referring now to FIGS. 1, 2A and 2B, a motor vehicle is shown and generally indicated by reference number 10. While the motor vehicle 10 illustrated is a car, it should be appreciated that the motor vehicle 10 may be any type of vehicle, including a car, a van, a truck, a motor home, or any other such vehicle without departing from the scope or intent of the present disclosure. The motor vehicle 10 includes a passenger compartment 12 having a plurality of seats 14. A center console 16 is disposed between a driver seat 18 and a passenger seat 20. While the center console 16 has been described as being between the driver seat 18 and the passenger seat 20 additional center consoles 16 may be placed elsewhere throughout the passenger compartment 12. For example, an additional center console 16 may be disposed between the rear seats 21 of the passenger compartment 12 without departing from the scope or intent of the present disclosure. The center console 16 serves several functions. In some aspects, the center console 16 provides a driver, a passenger, or rear seat passengers, or all of the above, a resting place for an arm. In other aspects, the center console 16 defines a storage compartment 22.

The storage compartment 22 has a front side 24 extending towards and connected at an angle to a passenger side 26. The passenger side 26 extends towards and is connected at an angle to a rear side 28. The rear side 28 extends towards and is connected at an angle to a driver side 30, and the driver side 30 extends towards and is connected at an angle to the front side 24. The storage compartment 22 also has a bottom 32. The bottom 32 is connected at an angle to each of the front, passenger, rear, and driver sides 24, 26, 28, 30. A compartment lid 34 covers the storage compartment 22. In several aspects, the compartment lid 34 has a substantially planar underside 36 and a padded top 38. The padded top 38 provides a soft and forgiving surface on which it is comfortable for an occupant of the motor vehicle 10 to rest an arm or other extremity. The lid 34 may take any of a variety of forms without departing from the scope or intent of the present disclosure. In some aspects, the lid 34 is rotatably connected to the center console 16 at a hinge 40. In other aspects, the lid 34 is slidably connected to the center console 16 along a racetrack (not specifically shown). In still further examples, the lid 34 may both slidably and rotatably connected to the center console 16. Additionally, the lid 34 may be monolithic or the lid 34 may have a plurality of movable components. That is, in some examples, the lid 34 operates as a single rotatable or slidable piece in relation to the center console 16 itself, while in other examples, the lid 34 may have multiple selectively independently movable sections (not specifically shown), each of which is independently movable relative to the center console 16 and/or to each other. In one example the lid 34 has a first panel (not shown) in hinged connection with the center console 16 substantially proximate to and parallel with the driver side 30 of the center console 16. The lid 34 also has a second panel (not shown) in hinged connection with the center console 16 substantially proximate to and parallel with the passenger side 26 of the center console 16. In another example, the lid 34 has a first panel (not shown) in hinged connection with the center console 16 substantially proximate to and parallel with the front side 24 of the center console 16. The lid 34 also has a second panel (not shown) in hinged connection with the center console 16 substantially proximate to and parallel with the rear side 28 of the center console 16. While in the foregoing description, the storage compartment 22 has been described as having four (front, passenger, rear, driver 24, 26, 28, 30) sides, a bottom 32, and a lid 34, it should be appreciated that the storage compartment 22 is defined by the vehicle platform. Accordingly, the storage compartment 22 may have more or fewer than four sides, and the bottom 32 may have a substantially non-planar surface. Additionally, the lid 34 has been described as having either a monolithic or a two-part structure, however it should be appreciated that the lid 34 may take other forms and have a structure that has more than two selectively independently movable component parts.

Dimensions of the storage compartment 22 vary in accordance with space constraints within the passenger compartment 12 of the motor vehicle 10. Thus, in a relatively large motor vehicle 10 such as a full-sized pickup truck the center console 16, and therefore, the storage compartment 22 each have dimension substantially larger than an equivalent center console 16 and storage compartment 22 in a relatively small vehicle such as a sub-compact motor vehicle 10.

Figure 3C:
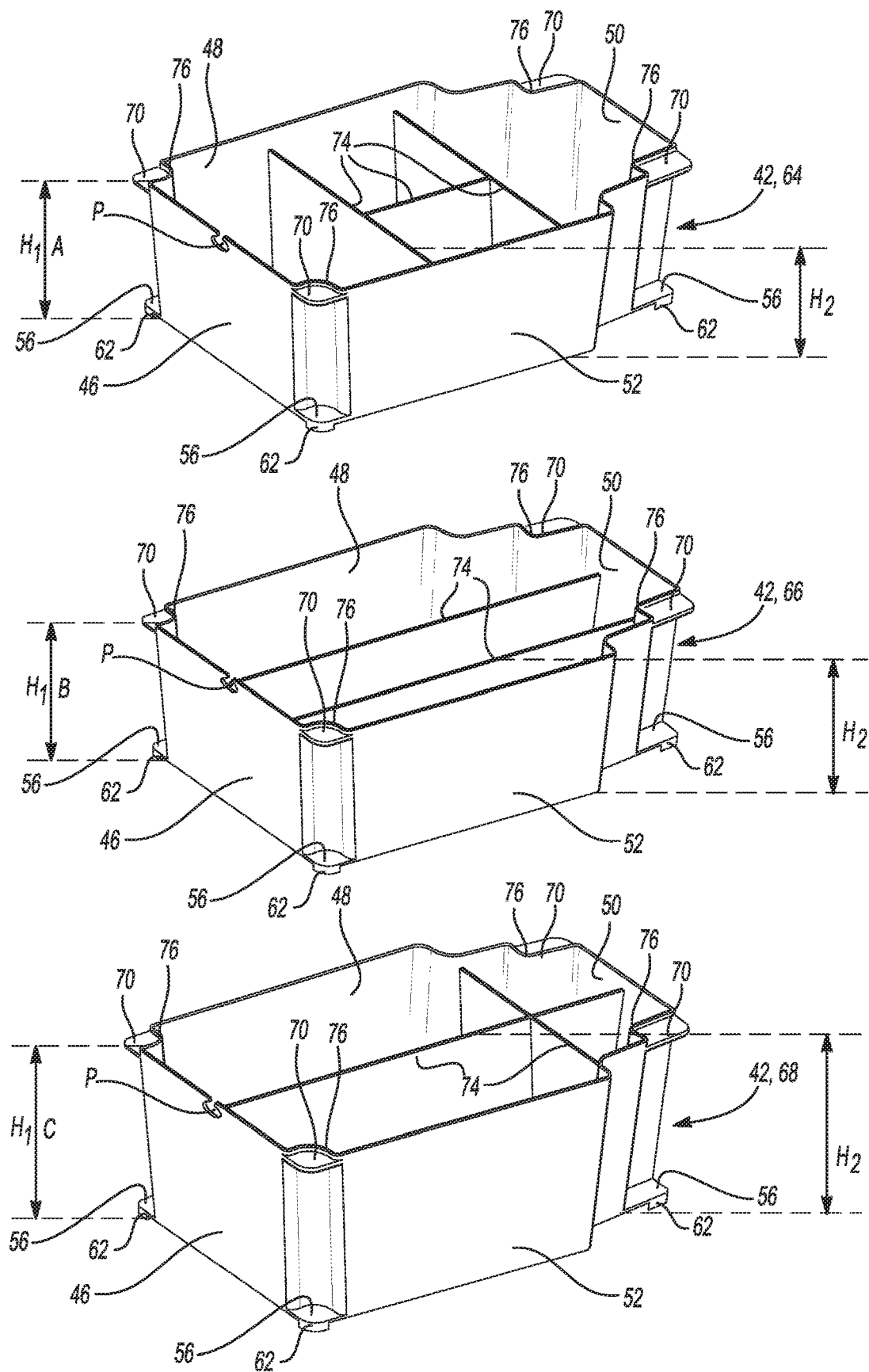
FIG. 3C is an exploded perspective view of the plurality of stackable/reconfigurable compartment bins of FIG. 3A according to an aspect of the present disclosure.

Turning now to FIGS. 3A-3C, and with continuing reference to FIGS. 1-2B, the storage compartment 22 is equipped with a plurality of compartment bins 42. Each of the compartment bins 42 is shaped and sized to fit within the storage compartment 22 of the motor vehicle 10. The compartment bins 42 can be constructed in any of a variety of different manners and from a variety of different materials in accordance with the production specifications and production volume requirements of the application. That is, in some aspects, the compartment bins 42 are constructed of a plastic material, a vinyl material, a metal material, or any other such material that meets predetermined structural characteristics and/or production specification and/or production volume requirements inherent to the application. The compartment bins 42 are formed by rapid prototyping processes such as 3-D printing, directed light fabrication, direct-shell production casting, ballistic particle manufacturing, selected laser sintering, or the like. In other aspects, the compartment bins 42 are formed by injection molding, rotational (roto) molding, extrusion blow molding, injection blow molding, vacuum casting, thermoforming, compression molding, or the like.

The compartment bins 42 each have a plurality of sidewalls including at least a front wall 46 substantially parallel to the front side 24 of the storage compartment 22. The front wall 46 extends towards and is connected at an angle to a passenger wall 48. The passenger wall 48 runs substantially parallel to the passenger side 26 of the storage compartment. The passenger wall 48 extends from the front wall 46 to a rear wall 50 to which the passenger wall 48 is connected at an angle. The rear wall 50 runs substantially parallel to the rear side 28 of the storage compartment 22. The rear wall 50 extends from the passenger wall 46 to a driver wall 52. The driver wall runs substantially parallel to the driver side 30 of the storage compartment 22. The driver wall 50 extends from the rear wall 50 to the front wall 46. The front wall 46 is connected at an angle to the driver wall 50. Each of the front, passenger, rear, and driver walls 46, 48, 50, 52 are connected at an angle to a base portion 54. In several aspects, the base portion 54 forms a substantially planar bottom portion of each of the compartment bins 42. The base portion and the front, passenger, rear, and driver walls 46, 48, 50, 52 and the base portion 54 are sized and shaped to fit concentrically within the storage compartment 22. More specifically, the base portion 54 is shaped and contoured to fit within the architecture of the storage compartment 22 of a given vehicle application. Moreover, each of the compartment bins 42 is shaped and sized to maximize utility, including maximizing storage capacity of the storage compartment 22 and of each of the compartment bins 42. In several aspects, as a means of maximizing storage capacity, each of the front, passenger, rear, and driver walls 46, 48, 50, 52 is angled slightly so that a top portion 56 of each is outside the footprint of the base portion 54. That is, at the top portion 56 each of the compartment bins 42 is wider than at locations proximate the base portion 54. Put another way, the front, passenger, rear, and driver walls 46, 48, 50, 52 flare outwardly from the footprint of the base portion 54 as they extend upward from the base portion 54. Each of the front, passenger, rear, and driver walls 46, 48, 50, 52 and the base portion 54 have a thickness "T" and each of the front, passenger, rear, and driver walls 46, 48, 50, 52 have a wall height "H1". In several aspects, depending on the method of production, the thickness "T" may vary between the front, passenger, rear, and driver walls 46, 48, 50, 52 and the base portion 54. In other aspects, some manufacturing methods produce front, passenger, rear, and driver walls 46, 48, 50, 52 and base portion 54 having substantially identical thicknesses "T". In some examples, depending on the architecture of the storage compartment 22, at least one of the front, passenger, rear, and driver walls 46, 48, 50, 52 has a wall height "H1" lower than at least one of the other walls. By providing at least one of the front, passenger, rear, and driver walls 46, 48, 50, 52 with a lower height than the walls around it, a user of the storage compartment 22 may effectively route electrical devices such as cellphone power cables, auxiliary input/output cables, USB cables or the like from a given compartment bin 42 to a power source such as a 12V lighter socket or the like. In some examples, rather than, or in addition to providing at least one of the front, passenger, rear, and driver walls 46, 48, 50, 52 with a decreased height relative to the other walls, at least one of the front, passenger, rear, and driver walls 46, 48, 50, 52 is formed with a passageway "P". The passageway "P" is sized and shaped to allow a cellphone charging cable, auxiliary input/output cables, USB cables, or the like, to pass from within the confines of a given compartment bin 42 into the volume defined by the storage compartment 22 itself. Moreover, in some aspects, at least one of the front, passenger, rear, and driver walls 46, 48, 50, 52 is provided with a lip (not specifically shown). Depending on the application, the lip extends either inwardly, outwardly, or both, and provides a user the ability to more easily grab or gain additional purchase of the given compartment bin 42 with a hand.

In several aspects, each of the compartment bins 42 has a foot portion 56. The foot portions 56 are depicted at intersections of each of the front, passenger, rear, and driver walls 46, 48, 50, and 52. The foot portion 56 is formed integrally as a part of the base portion 54 as well as with the front, passenger, rear, and driver walls 46, 48, 50, 52 of the compartment bins 42. In some examples, the foot portions 56 are substantially circular protrusions 58 extending from the base portion 54, while in other examples the foot portions 56 are substantially rectilinear protrusions 60 extending from the base portion 54. In some aspects, each of the foot portions 56 is provided with a foot pad 62. The foot pad 62 is made of a pliable material that extends downward from each of the foot portions 56. In some examples, the foot pads 62 are affixed to the foot portions 56 by an adhesive. The foot pads 62 are composed of a resilient material, such as a foam material, a rubberized plastic material, a silicone material, a rubber material, or other such cushioning and noise isolating materials. In some examples, the foot pads 62 are disposed along at least a portion of the base portion 54 along at least one of the front, passenger, rear, and driver walls 46, 48, 50, 52. By placing the foot pads 62 on either the foot portions 56, or along the base portion 54 along at least one of the front, passenger, rear, and driver walls 46, 48, 50, 52, the foot pads 62 are optimally placed to support a first bin 64 of the compartment bins 42 on a second bin 66 of the compartment bins 42. Moreover, a third bin 68 supports the second bin 66 in much the same way as the first bin 64 is supported by the second bin 66.

More specifically each of the first bin, second bin, and third bin 64, 66, 68 are integrally formed with support portions 70. The support portions 70 are located at intersections of the front, passenger, rear, and driver walls 46, 48, 50, 52 at positions substantially above the foot portions 56 relative to the base portion 54. The support portions 70 extend outwardly from the intersections of the front, passenger, rear, and side walls 46, 48, 50, 52. Like the foot portions 56, the support portions 70 are substantially circular protrusions 72 extending from the base portion intersections of the front, passenger, rear, and side walls 46, 48, 50, 52, while in other examples support portions 70 are substantially rectilinear protrusions 74 extending from front, passenger, rear, and driver walls 46, 48, 50, 52. Each of the support portions 70 is formed to accept foot portions 56 of compartment bins 42 stacked on top of one another. Accordingly, the support portions 70 are disposed directly vertically above the foot portions 56 on any given compartment bin 42, relative to the base portion 54. In one example, the support portions 70 are formed with a lip 76 optimally shaped to accept foot portions 56 or the foot pads 62 of a compartment bin 42 stacked on top of a given compartment bin 42. While in the foregoing description, the foot pads 62 have been described as being affixed to the foot portions 56, the foot pads 62 may also be affixed to the support portions 70 by an adhesive, thereby providing a padded surface for the foot portions 56 of a compartment bin 42 above to rest upon. For example the third bin 68 has support portions 70 shaped and sized to support the foot portions 56 or the foot pads 62 of the second bin 66. Likewise, the second bin 66 has support portions 70 shaped and sized to accept foot portions 56 or the foot pads 62 of the first bin 64. The support portions 70 of some examples are shaped to accept a tapered portion (not specifically shown) of the front, passenger, rear, and driver walls 46, 48, 50, 52 of the compartment bin 42 stacked above a given compartment bin 42.

With particular reference to FIG. 3C, and with continuing reference to FIGS. 1-3B, each of the first, second, and third bins 64, 66, 68 is provided with a plurality of dividers 74. The plurality of dividers 74 can vary in accordance with packaging constraints, likely occupant use modes, and the like. In some examples, the dividers 74 are formed integrally with each of the first, second, and third bins 64, 66, 68. However, the dividers 74 of each of the first, second, and third bins 64, 66, 68 may be arranged in any of a variety of different orientations. In the example of the first bin 64 in FIG. 3C, the dividers 74 are arranged in a substantially "H-shaped" pattern. In the example of the second bin 66 are formed as two parallel dividers 74 extending longitudinally from the front wall 46 to the rear wall 50 of the second bin 66. In the example of the third bin 68, the dividers are formed as in substantially the shape of a cross or a lowercase "t". However, it should be appreciated that any of a wide variety of different divider 74 arrangements may be used with any of the first, second, or third bins 64, 66, 68 without departing from the scope or intent of the present disclosure. In some aspects, the plurality of dividers 74 are reconfigurable. That is, the dividers 74 of some examples are formed as separate components from the first, second, and third bins 64, 66, 68 themselves. A plurality of guides (not specifically shown) may be formed in the front, passenger, rear, and driver walls 46, 48, 50, 52 of each of the compartment bins 42. The guides are shaped and sized to accept dividers 74 at various locations, thereby allowing an owner/operator of the motor vehicle 10 the ability to reconfigure storage space within each of the compartment bins 42. The dividers 74 are formed of substantially the same material as the compartment bins 42, and by substantially the same processes as the compartment bins 42. The dividers 74 also have a divider height "H2". The divider height "H2" is less than the wall height "H1". If the divider height "H2" was the same as or greater than the wall height "H1" of a given compartment bin 42, compartment bins 42 stacked vertically above the given compartment bin 42 would not be properly supported on the support portions 70 of the compartment bin 42 below. Accordingly, the divider height "H2" is, in most examples, lower than the wall height "H1" of any of the front, passenger, rear, or driver walls 46, 48, 50, 52. In some examples, the divider height "H1" is consistent between the first, second, and third bins 64, 66, 68. When the divider height "H1" is consistent between the first, second, and third bins 64, 66, 68 and the dividers 74 are separate reconfigurable components, each of the dividers 74 may be used in any of the first, second, and third bins 64, 66, 68. In other examples, the dividers 74 have divider heights "H2" that are specific to whichever of the first, second, and third bins 64, 66, 68 the dividers 74 reside within. Accordingly, when the divider heights "H2" are specific to the individual compartment bins 42, the dividers 74 may not efficiently be used in the other compartment bins 42 without impeding the stackability of the compartment bins 42. Additionally, in some examples, the dividers 74 may form a part of the support portion 70 of a compartment bin 42. In such examples, the divider height "H2" is no greater than the largest wall height "H1" of the compartment bin 42 in which the divider 74 resides.

The wall height "H1" of each of the first, second, and third bins 64, 66, 68 varies from bin to bin. That is, the first bin 64 has a first wall height "A". The second bin 66 has a second wall height "B". The third bin 68 has a third wall height "C". In several aspects, the first wall height "A" is different from the second wall height "B", and the third wall height "C" is different than either the first or the second wall heights "A", "B". However, it should be appreciated that according to the application for which the compartment bins 42 are intended, the wall heights "H1" of the compartment bins 42 may vary from each other, or the wall heights "H1" may be the same between the various compartment bins 42.

Figure 4A:
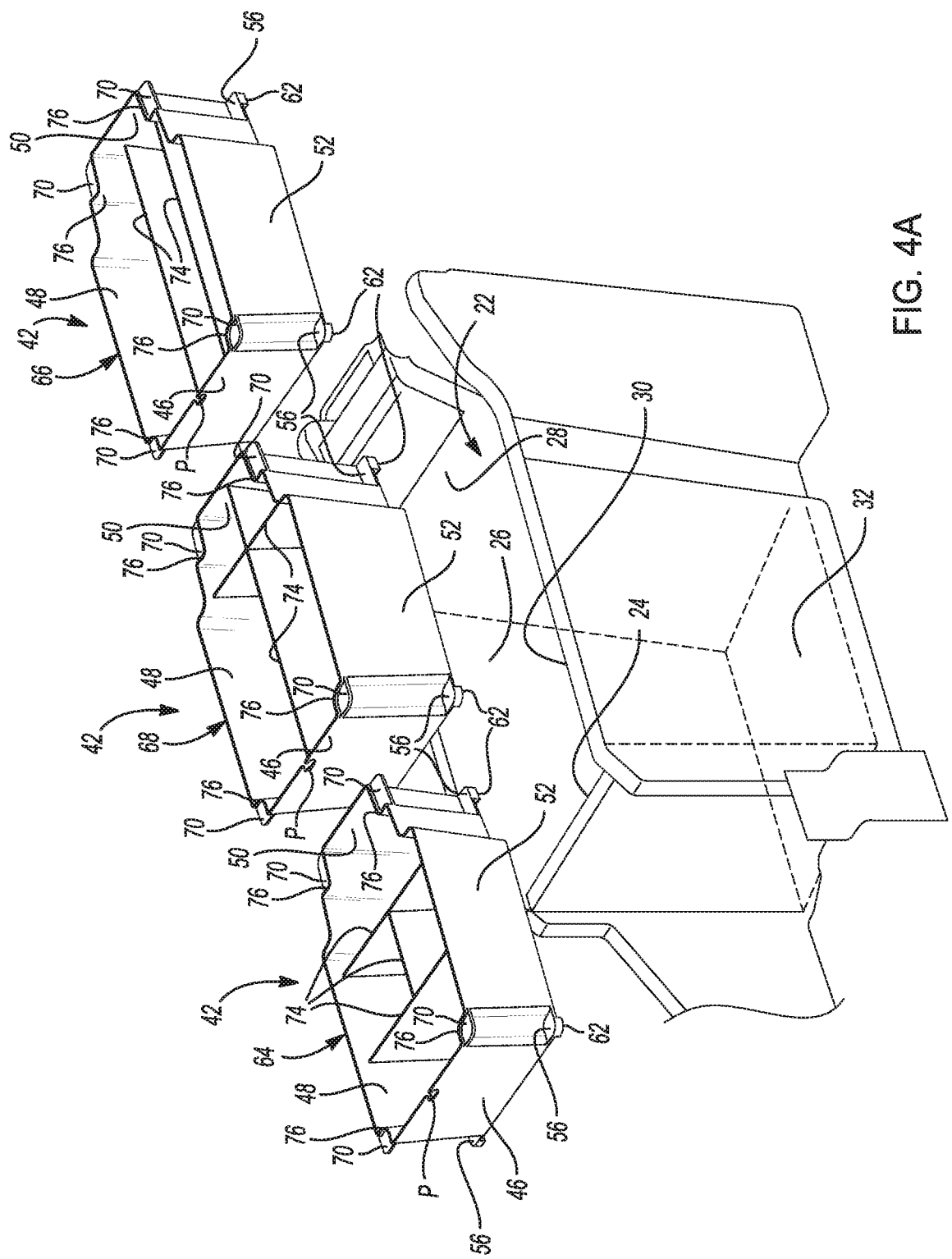
FIG. 4A is a partial wireframe exploded perspective view of the stackable/reconfigurable compartment bins in an un-stacked state according to an aspect of the present disclosure.
Figure 4B:
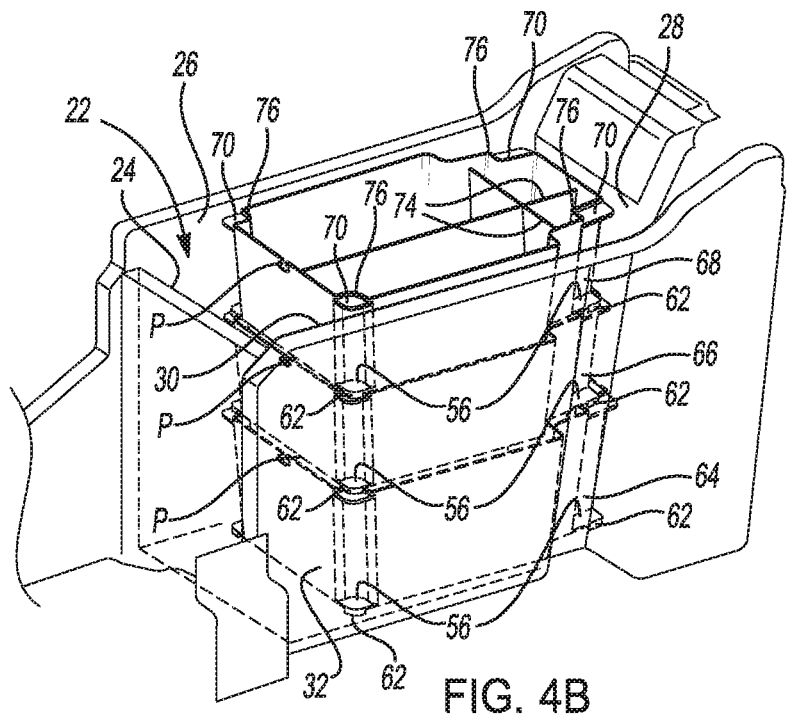
FIG. 4B is a partial wireframe exploded perspective view of the stackable/reconfigurable compartment bins of FIG. 4A assembled in a first stacked configuration according to an aspect of the present disclosure.
Figure 4C:
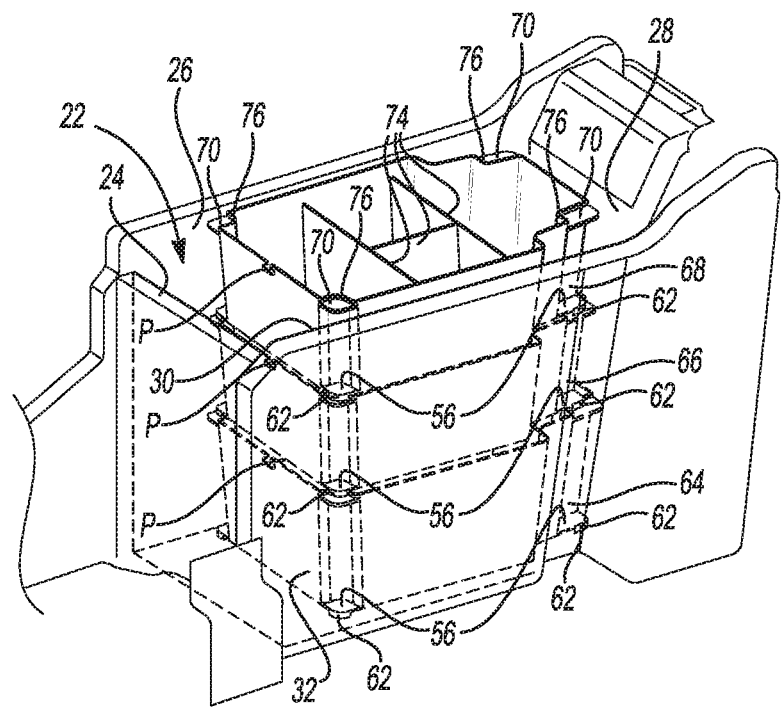
FIG. 4C is a partial wireframe exploded perspective view of the stackable/reconfigurable compartment bins of FIG. 4A assembled in a second stacked configuration according to another aspect of the present disclosure.

Turning now to FIGS. 4A-4C, and with continuing reference to FIGS. 1-3C, the compartment bins 42 are reconfigurable and stackable in a variety of different orders. That is, each of the first, second, and third bins 64, 66, 68 has an identically shaped and sized base portion 54 sized and shaped to fit within the storage compartment 22. Moreover, each of the first, second, and third bins 64, 66, 68 has front, passenger, rear, and driver walls 46, 48, 50, 52 that flare outward from the base portion 54 by an identical distance. Accordingly, when stacked on top of one another, the support portions 70 of each of the first, second, and third bins 64, 66, 68 precisely support the foot pads 62 of the foot portions 56 of whichever of the first, second, and third bins 64, 66, 68 is stacked vertically above. Put another way, any of the first, second, and third bins 64, 66, 68 may be placed at the bottom 32 of the storage compartment 22, and whichever remains of the first, second, and third bins 64 can be placed on top of the compartment bin 42 at proximate the bottom 32, followed by a final one of the first, second, and third bins 64, 66, 68 placed vertically on-top of the compartment bin 42 stacked atop the compartment bin 42 at the bottom 32. For example, in FIG. 4B the first bin 64 is at the bottom of the stack of compartment bins 42. The second bin 66 is stacked atop the first bin 64, and the third bin 68 is stacked atop the second bin 66. By contrast, in FIG. 4C, the first bin 64 is stacked atop the second bin 66, and the second bin 66 is stacked atop the third bin 68. It should be appreciated, however, that the first, second, and third bins 64, 66, 68, may be stacked or configured in any order within the storage compartment 22. Additionally, some or all of the first, second, and third bins 64, 66, 68 may be used in a given storage compartment 22 without departing from the scope or intent of the present disclosure. Moreover, the quantity of compartment bins 42 available to be used within a given motor vehicle 10 may vary from vehicle type to vehicle type. That is, because of the space constraints in a relatively small car, only one or two of the compartment bins 42 may be used, while in a larger motor vehicle 10 having a relatively larger and deeper storage compartment 22, greater than three of the compartment bins 42 may be used. Additionally, while the compartment bins 42 have thus far been depicted and described as stacking vertically and taking up substantially the entirety of the storage compartment 22, the compartment bins 42 may vary from these parameters. For example, the compartment bins 42 may take up only a portion of the longitudinal and/or lateral space within the storage compartment 22. Moreover, the compartment bins 42 may be stacked vertically as previously described and/or an additional set of supplemental compartment bins (not shown) may take up a space longitudinally or laterally adjacent the compartment bins 42 within the storage compartment 22 without departing from the scope or intent of the present disclosure.

A storage compartment 22 having stackable/reconfigurable compartment bins of the present disclosure offers several advantages. These include the ability to be retrofitted to current and future motor vehicles 10 at low cost, while offering a user of the motor vehicle 10 the ability to neatly and efficiently organize belongings within the storage compartment 22. Additionally, the multiple configurations for the compartment bins 42 allow a user to determine the order of the compartment bins 42 within a stack of compartment bins 42. Moreover, because the compartment bins 42 can be removed from the storage compartment 22 entirely, the space within the storage compartment 22 is optimized. Additionally, the placement of the passageway "P" and/or the decreased height of at least one of the front, passenger, rear, or driver walls 46, 48, 50, 52 allow a user the ability to conveniently use a power source, USB port, or other such auxiliary input/output while still taking advantage of the stacked compartment bins 42 for storage.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A storage compartment assembly for a motor vehicle center console storage compartment comprises:
   a plurality of compartment bins, each of the plurality of compartment bins comprising:
      a first wall extending towards and connected at a first angle to a second wall, the second wall extending from the first wall towards and connected at a second angle to a third wall, the third wall extending from the second wall towards and connected at a third angle to a fourth wall, the fourth wall extending from the third wall towards and connected at a fourth angle to the first wall, each of the first, second, third, and fourth walls extending from and connected at a fifth angle to a base portion, the first, second, third, and fourth walls, and the base portion partially enclosing a first volume;
      a plurality of foot portions extending outwardly from the base portion relative to the first volume at intersections of the first and second walls, the second and third walls, the third and fourth walls, and the fourth and first walls;
      a plurality of support members extending outwardly from the intersections of the first and second walls, the second and third walls, the third and fourth walls, and the fourth and first walls, and displaced vertically directly above the foot portions, relative to the base portion;
   wherein each of the plurality of compartment bins is stackable atop each of the others of the plurality of compartment bins in a plurality of permutations, and the plurality of compartment bins is disposed concentrically within the center console storage compartment of the motor vehicle; and wherein each of the first, second, third, and fourth walls has a first height, and wherein at least a portion of one of the first, second, third and fourth walls has a second height less than at least another of the first, second, third, and fourth walls such that at least one of the first, second, third, and fourth walls is formed with a passageway shaped and sized to accommodate an electrical device, wherein the passageway defines an aperture having a first width and a second width greater than the first width, wherein the first width is disposed at the first height and the second width is disposed at the second height, wherein each of the plurality of compartment bins further comprises a plurality of dividers, wherein the plurality of dividers have a second height less than the first height and the plurality of dividers are reconfigurable within the plurality of compartment bins.

2. The storage compartment assembly of claim 1 wherein each of the first, second, third, and fourth walls flares outwardly as the first, second, third, and fourth walls extend away from the base portion.

3. The storage compartment assembly of claim 1 wherein the plurality of foot portions or the plurality of support members further comprise a foot pad comprising a resilient material.

4. The storage compartment assembly of claim 1 wherein a first of the plurality of compartment bins has a first wall height, a second of the plurality of compartment bins has a second wall height different than the first wall height, and a third of the plurality of compartment bins has a third wall height different than the first wall height and the second wall height.

5. The storage compartment assembly of claim 1 wherein a quantity of the plurality of compartment bins used in the storage compartment is variable.

6. The storage compartment assembly of claim 1 wherein each of the plurality of compartment bins has a substantially uniform material thickness and is unitarily formed.

7. The storage compartment assembly of claim 1 wherein the plurality of compartment bins comprises a plastic, composite, or metal 3-D printed material, directed light fabricated material, direct-shell production cast material, ballistic particle manufactured material, selected laser sintered material, injection molded material, rotational (roto) molded material, extrusion blow molded material, injection blow molded material, vacuum cast material, thermoformed material, or compression molded material.

8. A storage compartment assembly for a motor vehicle center console storage compartment comprises:

a plurality of plastic or composite compartment bins, each of the plurality of compartment bins comprising:

a first wall extending towards and connected at a first angle to a second wall, the second wall extending from the first wall towards and connected at a second angle to a third wall, the third wall extending from the second wall towards and connected at a third angle to a fourth wall, the fourth wall extending from the third wall towards and connected at a fourth angle to the first wall, each of the first, second, third, and fourth walls extending from and connected at a fifth angle to a base portion, the first, second, third, and fourth walls, and the base portion partially enclosing a first volume;

a plurality of foot portions extending outwardly from the base portion relative to the first volume at intersections of the first and second walls, the second and third walls, the third and fourth walls, and the fourth and first walls;

a plurality of support members extending outwardly from the intersections of the first and second walls, the second and third walls, the third and fourth walls, and the fourth and first walls, and displaced vertically directly above the foot portions, relative to the base portion; and wherein each of the first, second, third, and fourth walls has a first height, and wherein at least a portion of one of the first, second, third and fourth walls has a second height less than at least another of the first, second, third, and fourth walls, such that at least one of the first, second, third, and fourth walls is formed with a passageway shaped and sized to accommodate an electrical device, wherein the passageway defines an aperture having a first width and a second width greater than the first width, wherein the first width is disposed at the first height and the second width is disposed at the second height, each of the plurality of compartment bins is stackable atop each of the others of the plurality of compartment bins in a plurality of permutations, and the plurality of compartment bins is disposed concentrically within the center console storage compartment of a motor vehicle.

9. The storage compartment assembly of claim 8 wherein each of the first, second, third, and fourth walls flares outwardly as the first, second, third, and fourth walls extend away from the base portion.

10. The storage compartment assembly of claim 8 wherein the plurality of foot portions or the plurality of support members further comprise a foot pad comprising a resilient material.

11. The storage compartment assembly of claim 8 wherein each of the plurality of compartment bins further comprises a plurality of dividers.

12. The storage compartment assembly of claim 11 wherein the plurality of dividers have a second height less than the first height and the plurality of dividers are reconfigurable within the plurality of compartment bins.

13. The storage compartment assembly of claim 8 wherein a first of the plurality of compartment bins has a first wall height, a second of the plurality of compartment bins has a second wall height different than the first wall height, and a third of the plurality of compartment bins has a third wall height different than the first wall height and the second wall height.

14. The storage compartment assembly of claim 8 wherein the plurality of compartment bins used in the storage compartment is variable.

15. The storage compartment assembly of claim 8 wherein the plurality of compartment bins comprises a plastic or composite 3-D printed material, directed light fabricated material, direct-shell production cast material, ballistic particle manufactured material, selected laser sintered material, injection molded material, rotational (roto) molded material, extrusion blow molded material, injection blow molded material, vacuum cast material, thermoformed material, or compression molded material, and each of the plurality of compartment bins has a substantially uniform material thickness.

16. A storage compartment assembly for a motor vehicle center console storage compartment comprises:
  a plurality of 3-D printed plastic or composite compartment bins having uniform thickness, each of the plurality of compartment bins comprising:
    a first wall extending towards and connected at first angle to a second wall, the second wall extending from the first wall towards and connected at a second angle to a third wall, the third wall extending from the second wall towards and connected at a third angle to a fourth wall, the fourth wall extending from the third wall towards and connected at a fourth angle to the first wall, each of the first, second, third, and fourth walls extending from and connected at a fifth angle to a base portion, the first, second, third, and fourth walls, and the base portion partially enclosing a first volume;
    a plurality of foot portions extending outwardly from the base portion relative to the first volume at intersections of the first and second walls, the second and third walls, the third and fourth walls, and the fourth and first walls;
    a plurality of support members extending outwardly from the intersections of the first and second walls, the second and third walls, the third and fourth walls, and the fourth and first walls, and displaced vertically directly above the foot portions, relative to the base portion; and
    wherein each of the first, second, third, and fourth walls has a first height, and wherein at least a portion of one of the first, second, third and fourth walls has a second height less than at least another of the first, second, third, and fourth walls, such that at least one of the first, second, third, and fourth walls is formed with a passageway shaped and sized to accommodate an electrical device, wherein the passageway defines an aperture having a first width and a second width greater than the first width, wherein the first width is disposed at the first height and the second width is disposed at the second height, each of the plurality of compartment bins is stackable atop each of the others of the plurality of compartment bins in a plurality of permutations, and the plurality of compartment bins is disposed concentrically within the center console storage compartment of the motor vehicle, each of the first, second, third, and fourth walls flares outwardly as the first, second, third, and fourth walls extend away from the base portion, the plurality of foot portions or the plurality of support members further comprise a foot pad comprising a resilient material, and each of the plurality of compartment bins further comprises a plurality of dividers having a second height less than the first height, and wherein a first of the plurality of compartment bins has a first wall height, a second of the plurality of compartment bins has a second wall height different than the first wall height, and a third of the plurality of compartment bins has a third wall height different than the first wall height and the second wall height.

\* \* \* \* \*